United States Patent Office 3,553,182
Patented Jan. 5, 1971

3,553,182
ALKENE OXIDE POLYMERIZATION CATALYZED BY ORGANOALUMINUM-ORGANOPHOSPHINE MIXTURES
Francis X. Mueller, Jr., Louisville, Ky., assignor to Phillips Petroleum Company, a corporation of Delaware
No Drawing. Filed June 21, 1968, Ser. No. 738,864
Int. Cl. C08g 23/06
U.S. Cl. 260—88.3     24 Claims

ABSTRACT OF THE DISCLOSURE

Alkene oxides containing 2 to 20 carbon atoms are polymerized in the presence of a catalyst formed by an organoaluminum compound and a triorganophosphine compound. One example of such a catalyst employs triisobutylaluminum and triphenylphosphine. In addition, these alkene oxides can be copolymerized with certain vinyl monomers.

---

Several different processes are known in the art for polymerizing alkene oxides to produce polymers which range in consistency from low molecular weight liquids to solid polymers of comparatively high molecular weight. The catalyst systems employed in certain of these processes include organoaluminum compounds, alone or in combination with other materials. However, many of the prior art polymerization systems result in a fairly low conversion of monomer.

In accordance with this invention, it has been found that the conversion rate and yield of polymer can be increased substantially by the use of catalyst systems formed by organoaluminum compounds and triorganophosphine compounds. The resulting polymers vary from viscous liquids to solid materials.

Accordingly, it is an object of this invention to provide improved processes for polymerizing alkene oxides.

Another object is to produce copolymers of alkene oxides and vinyl monomers.

Other objects, advantages and features of the invention should become apparent from the following detailed description.

The process of this invention is applicable to the polymerization of alkene oxides containing from 2 to 20 carbon atoms and which are represented by the formula

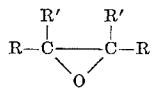

wherein each R and R' individually is hydrogen or a saturated aliphatic, saturated cycloaliphatic, monoolefinic aliphatic, diolefinic aliphatic (conjugated or non-conjugated), monoolefinic cycloaliphatic, diolefinic cycloaliphatic (conjugated or non-conjugated), or aromatic radical or a combination of these such as aralkyl, alkaryl, and the like. Some or all of the R and R' radicals can be halogen-substituted, and can contain oxygen in the form of an acyclic ether linkage (—O—) or an oxirane group

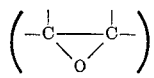

Further, the alkene oxides represented by the above formula can contain 1 or 2 olefinic linkages, 1 or 2 oxirane groups, and 1 ether linkage. In addition, both R' radicals can represent a divalent aliphatic hydrocarbon radical which, together with the carbon atoms of the oxirane group, can form a cycloaliphatic hydrocarbon nucleus containing from 4 to 10 carbon atoms.

Specific examples of some of the alkene oxides which can be polymerized in accordance with this invention are ethylene oxide (epoxyethane); 1,2 - epoxypropane (propylene oxide); 1,2-epoxybutane; 2,3-epoxybutane; 1,2 - epoxypentane; 2,3-epoxypentane; 1,2-epoxyhexane; 3,4 - epoxyhexane; 1,2-epoxyheptane; 2,3-epoxyoctane; 2,3 - dimethyl-2,3-epoxypentane; 1,2-epoxy-4-methylpentane; 2,3-epoxy-5-methylhexane; 1,2-epoxy-4,4-dimethylpentane, 4,5 - epoxyeicosane; 1-chloro-2,3-epoxypropane (epichlorohydrin); 1 - bromo-2,3-epoxypropane; 1,5-dichloro-2,3-epoxypentane; 2-iodo-3,4-epoxybutane; styrene oxide; 6-oxabicyclo[3.1.0]hexane; 7 - oxabicyclo[4.1.0] heptane; 3-n-propyl-7oxabicyclo[4.1.0]heptane; bis(2,3-epoxybutyl) ether; tert-butyl 4,5-epoxyhexyl ether; and 2-phenylethyl 3,4-epoxybutyl ether.

Specific examples of some unsaturated alkene oxides which can be polymerized in accordance with this invention include:

allyl 2,3-epoxypropyl ether (allyl glycidyl ether);
allyl 3,4-epoxybutyl ether;
1-methallyl 3,4-epoxyhexyl ether;
3-hexenyl 5,6-epoxyhexyl ether;
2,6-octadienyl 2,3,7,8-diepoxyoctyl ether;
6-phenyl-3-hexenyl 3-ethyl-5,6-epoxyhexyl ether;
3,4-epoxy-1-butene (butadiene monoxide);
3,4-epoxy-1-pentene;
5-phenyl-3,4-epoxy-1-pentene;
1,2,9,10-diepoxy-5-decene;
6,7-di-n-butyl-3,4,9,10-diepoxy-1,11-dodecadiene;
epoxy vinyl ether;
allyl 2-methyl-2,3-epoxypropyl ether;
3-cyclohexyl-2-propenyl 4-cyclohexyl-3,4-epoxybutyl ether;
2,4-pentadienyl 2,3-diethyl-3,4-epoxybutyl ether;
1-methallyl 6-phenyl-3,4-epoxyhexyl ether;
5-(4-tolyl)2,3-epoxypentyl vinyl ether;
bis[4-(3-cyclopentenyl)2,3-epoxybutyl] ether;
2-(2,4-cyclohexadienyl)ethyl 2,3-epoxybutyl ether;
2-(2,5-cyclohexadienyl)ethyl 2-benzyl-4,5-epoxypentyl ether;
3,4-epoxy-1,5-hexadienyl isopropyl ether;
allyl 3,4-dimethyl-3,4-epoxyhexyl ether;
3,4-epoxy-4-(2,3-dimethylphenyl)-1-butene;
3,4-dimethyl-3,4-epoxy-1-pentene;
5-(4-methylcyclohexyl)-3,4-epoxy-1-pentene;
4,5-diethyl-4,5-epoxy-2,6-octadiene;
4-(2,4-cyclopentadienyl)-1,2,6,7-diepoxyheptane; and
1-phenyl-1,2-epoxy-5,7-octadiene.

This invention is applicable to the formation of homopolymers or copolymers of the foregoing alkene oxides. In addition, copolymers of these alkene oxides with one or more vinyl monomers can be produced. The vinyl monomers which can be so employed are represented by the formula

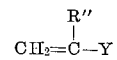

wherein R″ is hydrogen or an alkyl, aryl, alkaryl or aralkyl radical containing from 1 to 8 carbon atoms and Y is selected from

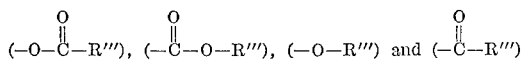

wherein R‴ is an alkyl, aryl, alkaryl or aralkyl radical containing from 1 to 20 carbon atoms. Examples of such vinyl monomers include methyl acrylate; ethyl acrylate; n-butyl acrylate; methyl methacrylate; isopropyl methacrylate; methyl vinyl ketone; n-hexyl vinyl ketone; methyl vinyl ether; tert-butyl vinyl ether; eicosyl acrylate; eicosyl vinyl ketone; eicosyl vinyl ether; vinyl heneicosanoate; vinyl acetate; vinyl benzoate; vinyl phenylacetate; vinyl 3,5-diheptylbenzoate; 2-phenylbutyl vinyl ketone; 1-naphthyl vinyl ketone; methyl 2-octylacrylate; methyl 2-benzylacrylate; methyl 2-(p-tolyl)-acrylate; eicosyl 2-octylacrylate; eicosyl methacrylate; benzyl methacrylate; 4-ethylphenyl methacrylate; phenyl methacrylate; 3-butylphenyl vinyl ketone; phenyl vinyl ether; benzyl vinyl ether; 3,5-diheptylphenyl vinyl ether; and 4,6-dipentyl-2-naphthyl vinyl ether.

The amount of vinyl monomer or monomers so employed is in the range of 0–60 parts by weight per 100 parts of total monomer.

The catalyst employed in the process of this invention is formed by at least one organoaluminum compound and at least one triorganophosphine compound. The organoaluminum compounds are represented by the formula $$R^{iv}_n AlH_m$$

where each $R^{iv}$ is an aliphatic, cycloaliphatic or aromatic radical, containing from 1 to 20 carbon atoms, $n$ is an integer from 1 to 3, $m$ is an integer from 0 to 2, and $n+m$ equals 3. Examples of these compounds include trimethylaluminum, triethylaluminum, tri-n-propylaluminum, triisopropylaluminum, tri-n-butylaluminum, triisobutylaluminum, triisoamylaluminum, tri-n-hexylaluminum, tri-n-octylaluminum, tri-n-dodecylaluminum, tricyclohexylaluminum, triphenylaluminum, tribenzylaluminum, trieicosylaluminum, diethyl-n-butylaluminum, tri-4-tolylaluminum, tri(2-hexyltetradecyl)aluminum, methyldi(4-cyclohexyloctyl)aluminum, ethyldi(2-butylcyclohexyl)-aluminum, tri(2,4,8-trimethylhendecyl)aluminum, isopropylaluminum dihydride, n-nonylaluminum dihydride, 4-methylcyclohexylaluminum dihydride, 2,4,6-triethylphenylaluminum dihydride, 3,5,7-tri-n-propylhendecylaluminum dihydride, diethylaluminum hydride, di(2,4,6-trimethylhexyl)aluminum hydride, methyl(benzyl)aluminum hydride, di-tert-butylaluminum hydride, dieicosylaluminum hydride, and the like.

The triorganophosphine compounds are represented by the formula $$R^v_3 P$$

wherein $R^v$ is the same as described above for $R^{iv}$ and, in addition, the hydrocarbon radicals can contain alkoxy substituents. Examples of these compounds include trimethylphosphine, triisopropylphosphine, tri-n-hexyl phosphine, ethyldi-n-tridecylphosphine, trieicosylphosphine, methyl(dicyclopentyl)phosphine, triphenylphosphine, tribenzylphosphine, tri(4-methoxyphenyl)phosphine, tri(3,5-diethoxyphenyl)phosphine, tri(5-methoxypentyl)phosphine, and the like.

The amount of catalyst employed, which is conveniently expressed on the basis of the organoaluminum compound in the catalyst system, can vary over a broad range. As a general rule, such amount of catalyst is maintained within the range of about 1 to about 100 gram millimoles of organoaluminum compound per 100 grams of monomer being polymerized, with particularly good results being obtained in the range of about 5 to 40 gram millimoles of organoaluminum compound per 100 grams of monomer. In the copolymerization of two or more alkene oxides, or the copolymerization of one or more alkene oxides with other monomer, the amount of catalyst is based on the total amount of monomer. The mole ratio of organoaluminum compound to triorganophosphine compound is in the range of 1:1 to 20:1, with particularly good results being obtained in the range 1:1 to 10:1. Mixtures of more than one of each of the catalyst components can be employed.

The polymerization reaction can be conducted either as a batch or as a continuous process with the catalyst being added as a single initial charge or in increments during the polymerization. The catalyst system can be prepared by mixing the two components and charging the resulting material to the reactor. As an alternative, the catalyst components can be charged separately. Similarly, the monomer can be introduced into the reaction zone as one charge or gradually during the polymerization. In order to improve the efficiency of the polymerization reaction, it is generally preferred that the reaction be conducted in the presence of an inert diluent. Suitable diluents which can be used for this purpose include paraffinic, cycloparaffinic, and aromatic hydrocarbons containing from 4 to 10 carbon atoms per molecule. Exemplary diluents which can be used are butane, pentane, hexane, decane, cyclopentane, cyclohexane, methylcyclohexane, benzene, toluene, xylene, ethylbenzene, and the like. Halogenated hydrocarbons of the type set forth, such as chlorobenzene, can also be employed. Mixtures of two or more diluents can be used.

The temperature and pressure at which the polymerization reaction is effected can vary over a wide range. The temperature is generally within the range of −50 to 250° F., preferably in the range of −25 to 175° F. Polymerization is usually conducted at a pressure which will maintain the materials substantially completely in the liquid state.

The duration of the reaction depends primarily on temperature, pressure, and the activity of the particular catalyst being used. Usually the polymerization is conducted for a period of from about 5 minutes to 100 hours or more. A preferred range is from about 10 minutes to 50 hours. Termination of the reaction, removal of catalyst, recovery of polymer, etc., can be carried out in any conventional manner.

The products produced according to this invention vary, depending on the monomer or monomers employed and the amount of catalyst. Products varying from liquids to solids can be obtained but, in general, they are of relatively low molecular weight. These materials have utility in adhesive formulations, as plasticizers for resins, cork, and rubbers, e.g., polyvinyl chloride, alkene oxide rubbers, etc. and since they contain terminal hydroxy groups, they can be employed as chemical intermediates for a variety of resinous materials. The products are also useful as lubricants in textile processing, metal extrusion, and the molding of rubber articles.

The following examples serve to illustrate the improved results obtained by polymerizing alkene oxides in accordance with this invention. It should be understood that these examples are for the purpose of illustration only.

EXAMPLE I

Ethylene oxide was polymerized by the catalyst system of this invention and by use of each of the catalyst components alone. One run was conducted using triisobutylaluminum alone as the catalyst, another using triphenylphosphine alone, and a third using both materials. In each run 100 parts by weight of the monomer and 780 parts by weight of cyclohexane were employed, with the cyclohexane being charged to the reactor first. The reactor was then purged with nitrogen, ethylene oxide was added, and finally the catalyst. In the run in which both catalyst components were used, triisobutylaluminum was charged first. The temperature was adjusted to 41° F. and maintained at this level for three hours. After a three-hour polymerization period, each reaction was shortstopped with a 10 weight percent solution of 2,2′- methylene-bis(4-methyl-6-tertbutylphenol) in equal parts by volume of isopropyl alcohol and toluene, using an amount sufficient to provide approximately one part by weight of the antioxidant per 100 parts by weight of the polymer. The polymer was recovered by evaporation of the diluent. In each case the product was a white solid. The amounts of catalyst components and conversions were as follows:

| Run No.: | TBA, mhm | $\phi_3$P, mhm | Conv., percent |
|---|---|---|---|
| 1 | 20 | 0 | 18 |
| 2 | 0 | 10 | 2 |
| 3 | 20 | 10 | 100 |

NOTE.—mhm = gram millimoles per 100 grams monomer.

These data show that conversion was 100% in the run made according to the invention (Run No. 3) but was quite low in the other two runs.

EXAMPLE II

Epichlorohydrin (100 parts by weight) was polymerized in toluene (860 parts by weight) using triisobutylaluminum, triphenylphosphine, and the two components as catalysts in order to demonstrate the effect of the two components. The procedure was the same as that described in Example I except that the temperature was 158° F. and the time was 6 hours. The results were as follows:

| Run No.: | TBA, mhm | $\phi_3$P, mhm | Conv., percent |
|---|---|---|---|
| 1 | 20 | 0 | 11 |
| 2 | 0 | 10 | 1 |
| 3 | 20 | 10 | 93 |

These data show that triphenylphosphine gave very little polymer when used alone, but a high conversion was obtained when it was combined with the triisobutylaluminum. Conversion was low when triisobutylaluminum was used alone. The products were viscous liquids with a high degree of tack.

Another run was made according to Run No. 3 except that the polymerization time was 24 hours and the temperature was 158° F. Conversion was quantitative. The polymerization mixture in toluene was washed several times with water to remove catalyst residue. The aqueous and organic phases were separated and the polymer was recovered by evaporation of the toluene. The product was a viscous liquid with an inherent viscosity of 0.05 and a gel content of 5 weight percent. Analysis gave 36.2 weight percent chlorine and 0.75 weight percent hydroxy group.

EXAMPLE III

Several runs were conducted at different temperatures. The polymerization recipe was as follows:

Epichlorohydrin or propylene oxide, parts by weight _____ 100
Toluene, parts by weight _____ 860
Triisobutylaluminum, mhm. _____ 20
Triphenylphosphine, mhm. _____ 10
Temperature, ° F. _____ Variable
Time, hours _____ 72

Results were as follows:

| | Epichlorohydrin polymerization | | | Propylene oxide polymerization | | |
|---|---|---|---|---|---|---|
| | 1 | 2 | 3 | 4 | 5 | 6 |
| Temperature, ° F | 158 | 122 | 41 | 158 | 41 | −22 |
| Conversion, percent | 100 | 100 | 100 | 88 | 100 | 100 |

All products were viscous liquids. The number average molecular weight on the product from Run No. 1 was found to be 1300. The chlorine content was 37.2 weight percent and the hydroxy content was 1.23 weight percent.

EXAMPLE IV

Several runs were conducted in which epichlorohydrin was polymerized using toluene as a diluent. The quantities of epichlorohydrin, toluene, and triisobutylaluminum were the same as in Example III. The temperature was 158° F. and the polymerization time was 24 hours. All products were viscous liquids. Results were as follows:

| Run No.: | $\phi_3$P, mhm | Conv., percent | Inherent viscosity | Gel, percent |
|---|---|---|---|---|
| 1 | 0 | 35 | 0.23 | 0 |
| 2 | 2 | 55 | 0.11 | 0 |
| 3 | 5 | 91 | 0.10 | 0 |
| 4 | 10 | 100 | 0.06 | 0 |

These data show a substantial increase in conversion with the addition of triphenylphosphine to triisobutylaluminum. The inherent viscosity decreased as the triphenylphosphine was increased.

EXAMPLE V

The effect of variable quantities of tris(4-methoxyphenyl)phosphine $[CH_2O\phi)_3P]$ on the polymerization of epichlorohydrin in the presence of triisobutylaluminum was determined. Toluene was employed as the diluent. The quantities of epichlorohydrin, toluene, and triisobutylaluminum were the same as in Example III. The temperature was 158° F. and the time was 24 hours. All products were viscous liquids and contained no gel. Results were as follows:

| Run No.: | $(CH_3O)-\phi_3$P, mhm | Conv., percent | Inherent Viscosity |
|---|---|---|---|
| 1 | 0 | 2 | (¹) |
| 2 | 2 | 76 | 0.09 |
| 3 | 5 | 100 | 0.07 |
| 4 | 10 | 100 | 0.05 |
| 5 | 15 | 100 | 0.04 |

¹ Not detected.

These data show that tris(4-methoxyphenyl)phosphine is an effective catalyst component. Increasing amounts of this material decreased the inherent viscosity of the polymer.

EXAMPLE VI

The effect of the tri-n-butylphosphine (10 mhm.) as a catalyst component for the polymerization of epichlorohydrin in the presence of triisobutylaluminum was determined. Toluene was the diluent, the polymerization temperature was 158° F., and the time was 28 hours. The quantities of epichlorohydrin, toluene, and triisobutylaluminum were the same as in Example III. The conversion was 58 percent. The product was a viscous liquid. A comparison of this result with control runs for epichlorohydrin polymerization in preceding examples shows that tri-n-butylphosphine is effective as a catalyst component.

EXAMPLE VII

Runs were conducted for the copolymerization of epichlorohydrin with propylene oxide (ECH—PO) and epichlorohydrin with allyl glycidyl ether (ECH—AGE). The polymerization recipes and results were as follows:

| | 1 | 2 |
|---|---|---|
| Epichlorohydrin, parts by weight | 50 | 94 |
| Propylene oxide, parts by weight | 50 | --- |
| Allyl glycidyl ether, parts by weight | --- | 6 |
| Toluene, parts by weight | 860 | 860 |
| Triisobutylaluminum, mhm | 20 | 20 |
| Triphenylphosphine, mhm | 10 | 10 |
| Temperature, ° F | 158 | 158 |
| Time, hours | 48 | 48 |
| Conversion, percent | 62 | 100 |

Unsaturation was determined on the product from run 2 by iodine chloride titration and found to be 0.58 millimole ICl/g. polymer.

EXAMPLE VIII

Ethylene oxide was copolymerized with methyl methacrylate in a 50/50 weight ratio using 780 parts by weight of cyclohexane per 100 parts by weight of total monomers as the diluent. The catalyst was triisobutylaluminum (20 mhm.) and triphenylphosphine (10 mhm.). The polymerization was conducted at 158° F. for 24 hours. Quantitative conversion was obtained. The product was a white solid.

EXAMPLE IX

Epichlorohydrin was copolymerized with methyl methacrylate using the following recipe:

| | |
|---|---|
| Epichlorohydrin, parts by weight | 50 |
| Methyl methacrylate, parts by weight | 50 |
| Toluene, parts by weight | 860 |
| Triisobutylaluminum, millimoles | 20 |
| Triphenylphosphine, millimoles | 10 |
| Temperature, ° F. | 41 |
| Time, hours | 72 |

Results

| | |
|---|---|
| Conversion, percent | 67 |
| Chlorine, wt. percent | 29.8 |
| Epichlorohydrin in polymer, percent | 78 |

The product in this run was a transparent rubbery solid. In this run toluene was charged to the reactor first followed by a nitrogen purge of the diluent. Epichlorohydrin was added next followed by methylmethacrylate after which the mixture was cooled to about 0° C. in an ice bath. Triisobutylaluminum was charged next and finally the triphenyl phosphine. This run was terminated and the polymer recovered as in Example I. The recovered polymer was washed with dilute mineral acid and then water before submission of a sample for determination of chlorine content by gravimetric chlorine analysis of the products of complete combustion of the sample.

While this invention has been described in conjunction with presently preferred embodiments, it should be apparent that it is not limited thereto.

What is claimed is:

1. The method which comprises polymerizing at least one alkene oxide or substituted alkene oxide containing from 2 to 20 carbon atoms of the formula

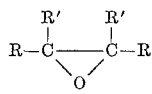

where each R and R' is hydrogen or a saturated aliphatic, saturated cycloaliphatic, monoolefinic aliphatic, diolefinic aliphatic, monoolefinic cycloaliphatic, or diolefinic cycloaliphatic hydrocarbyl radical or a halogen-substituted aliphatic hydrocarbyl radical of the foregoing type, wherein said radicals can contain oxygen in the form of an acylic ether linkage (—O—) and said alkene oxide or substituted alkene oxide can contain 1 or 2 olefinic linkages, or 1 ether linkage, and both of the R' radicals in said alkene oxide can represent a divalent aliphatic hydrocarbon radical which together with the oxirane group in said alkene oxide can form a cycloaliphatic nucleus, or one of said R and R' can be an aromatic radical, said polymerization being conducted in the presence of a catalyst formed by mixing (a) at least one compound containing from 1 to 20 carbon atoms of the formula $R^{iv}{}_nAlH_m$ where each $R^{iv}$ is an alkyl group, $n$ is 1, 2 or 3, $m$ is 0, 1 or 2, and $n+m$ is 3, and (b) at least one compound of the formula $R^v{}_3P$ where each $R^v$ is an $R^{iv}$ group or an aryl or alkoxy aryl group.

2. The method of claim 1 wherein said at least one alkene oxide or substituted alkene oxide is copolymerized with at least one vinyl monomer of the formula

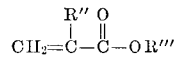

wherein R" is hydrogen or an alkyl, aryl, alkaryl or aralkyl radical containing from 1 to 8 carbon atoms and wherein R''' is an alkyl, aryl, alkaryl or aralkyl radical containing from 1 to 20 carbon atoms, said vinyl monomer comprising up to 60 weight percent of the total monomer being polymerized.

3. The method of claim 1 wherein the polymerization is conducted in the presence of a diluent comprising at least one compound containing from 4 to 10 carbon atoms and comprising (a) a paraffinic, cycloparaffinic or aromatic hydrocarbon or (b) a halogenated hydrocarbon of the type set forth in group (a) of this claim.

4. The method of claim 1 wherein the polymerization is conducted at —50 to 200° F., the catalyst contains 1 to 100 gram millimoles of compound (a) per 100 grams of monomer, and the mole ratio of compound (a) to compound (b) is in the range 1:1 to 20:1.

5. The method of claim 4 wherein compound (a) comprises triisobutylaluminum and compound (b) comprises triphenylphosphine.

6. The method of claim 4 wherein compound (a) comprises triisobutylaluminum and compound (b) comprises tris(4-methoxyphenyl)phosphine.

7. The method of claim 4 wherein compound (a) comprises triisobutylaluminum and compound (b) comprises tri-n-butylphosphine.

8. The method of claim 4 wherein the alkene oxide comprises ethylene oxide.

9. The method of claim 4 wherein the alkene oxide comprises epichlorohydrin.

10. The method of claim 4 wherein the alkene oxide comprises a mixture of epichlorohydrin and propylene oxide.

11. The method of claim 4 wherein the alkene oxide comprises a mixture of epichlorohydrin and allyl glycidyl ether.

12. The method of claim 2 wherein said alkene oxide comprises ethylene oxide and said vinyl monomer comprises methyl methacrylate.

13. The method of claim 2 wherein said alkene oxide comprises epichlorohydrin and said vinyl monomer comprises methyl methacrylate.

14. The method of polymerizing at least one alkene oxide or substituted alkene oxide selected from the group consisting of ethylene oxide; propylene oxide; 1,2-epoxybutane; 2,3-epoxybutane; 1,2-epoxypentane; 2,3-epoxypentane; 1,2-epoxyhexane; 3,4-epoxyhexane; 1,2-epoxyheptane; 2,3 - epoxyoctane; 2,3 - dimethyl - 2,3-epoxypentane; 1,2-epoxy-4-methylpentane; 2,3-epoxy-5-methylhexane; 1,2-epoxy-4,4-dimethylpentane; 4,5-epoxyeicosane; epichlorohydrin; 1-bromo-2,3-epoxypropane; 1,5-dichloro - 2,3 - epoxypentane; 2-iodo-3,4-epoxybutane; styrene oxide; 6-oxabicyclo[3.1.0]hexane; 7-oxabicyclo[4.1.0]heptane; 3 - n - propyl - 7 - oxabicyclo[4.1.0]heptane; bis(2,3-epoxybutyl) ether; tert-butyl 4,5-epoxyhexyl ether; 2-phenylethyl 3,4-epoxybutyl ether; allyl 2,3-epoxypropyl ether; allyl 3,4-epoxybutyl ether; 1-methallyl 3,4-epoxyhexyl ether; 3-hexenyl 5,6-epoxyhexyl ether; 2,6-octadienyl 2,3,7,8-diepoxyoctyl ether; 6-phenyl-3 - hexenyl 3 - ethyl-5,6-epoxyhexyl ether; 3,4-epoxy-1-butene; 3,4-epoxy-1-pentene; 5-phenyl-3,4-epoxy-1-pentene; 1,2,9,10-diepoxy-5-decene; 6,7-di-n-butyl-3,4,9,10-diepoxy-1,11-dodecadiene; epoxy vinyl ether; allyl 2-methyl-2,3-epoxypropyl ether; 3 - cyclohexyl-2-propenyl 4 - cyclohexyl - 3,4 - epoxybutyl ether; 2,4-pentadienyl 2,3-diethyl-3,4-epoxybutyl ether; 1 - methallyl 6-phenyl-3,4-epoxyhexyl ether; 5 - (4 - tolyl)2,3-epoxypentyl vinyl ether; bis[4 - (3 - cyclopentenyl)2,3-epoxybutyl] ether; 2-(2,4 - cyclohexadienyl)ethyl 2,3 - epoxybutyl ether;

2 - (2,5-cyclohexadienyl)ethyl 2-benzyl-4,5-epoxypentyl ether; 3,4-epoxy-1,5-hexadienyl isopropyl ether; allyl 3,4-dimethyl - 3,4 - epoxyhexyl ether; 3,4-epoxy-4-(2,3-dimethylphenyl) - 1 - butene; 3,4-dimethyl-3,4-epoxy-1-pentene; 5-(4-methylcyclohexyl)3,4-epoxy-1-pentene; 4,5-diethyl - 4,5 - epoxy - 2,6 - octadiene; 4-(2,4-cyclopentadienyl)1,2,6,7-diepoxyheptane; and 1-phenyl-1,2-epoxy-5,7-octadiene; said polymerization being conducted in the presence of a catalyst formed by mixing (a) a compound selected from the group consisting of trimethylaluminum; triethylaluminum; tri - n - propylaluminum; triisopropylaluminum; tri-n-butylaluminum; triisobutylaluminum; triamylaluminum; tri - n - hexylaluminum; tri - n - octylaluminum; tri-n-dodecylaluminum; tricyclohexylaluminum; triphenylaluminum; tribenzylaluminum; trieicosylaluminum; diethyl - n - butylaluminum; tri-4-tolylaluminum; tri(2-hexyltetradecyl)aluminum; methyldi(4-cyclohexyloctyl)aluminum; ethyldi(2-butylcyclohexyl)aluminum; tri(2,4,8-trimethylhendecyl)aluminum; isopropylaluminum dihydride; n-nonylaluminum dihydride; 4-methylcyclohexylaluminum dihydride; 2,4,6 - triethylphenylaluminum dihydride; 3,5,7-tri-n-propylhendecylaluminum dihydride; diethylaluminum hydride; di(2,4,6-trimethylhexyl)aluminum hydride; methyl(benzyl)aluminum hydride; di - tert - butylaluminum hydride; and dieicosylaluminum hydride; and (b) a compound selected from the group consisting of trimethylphosphine; triisopropylphosphine; tri-n-butylphosphine; tri-n-hexyl phosphine; ethyldi-n-tridecylphosphine; trieicosylphosphine; methyl(dicyclopentyl)phosphine; triphenylphosphine; tribenzylphosphine; tri(4-methoxyphenyl)phosphine; tri(3,5-diethoxyphenyl)phosphine; and tri(5-methoxypentyl)phosphine.

15. The method of claim 14 wherein said at least one alkene oxide or substituted alkene oxide is copolymerized with at least one vinyl monomer selected from the group consisting of methyl acrylate; ethyl acrylate; n-butyl acrylate; methyl methacrylate; isopropyl methacrylate; eicosyl acrylate; methyl 2-octylacrylate; methyl 2 - benzylacrylate; methyl 2-(p-tolyl)-acrylate; eicosyl 2-octylacrylate; eicosyl methacrylate; benzyl methacrylate; 4-ethylphenyl methacrylate; and phenyl methacrylate.

16. The method of claim 14 wherein the polymerization is conducted at −50 to 200° F., the catalyst contains 1 to 100 gram millimoles of compound (a) per 100 grams of monomer, and the mole ratio of compound (a) to compound (b) is in the range 1:1 to 20:1.

17. The method of claim 1 in which ethylene oxide is polymerized in the presence of a catalyst formed by (a) triisobutylaluminum and (b) triphenylphosphine.

18. The method of claim 1 in which epichlorohydrin is polymerized in the presence of a catalyst formed by (a) triisobutylaluminum and (b) triphenylphosphine.

19. The method of claim 1 in which propylene oxide is polymerized in the presence of a catalyst formed by (a) triisobutylaluminum and (b) triphenylphosphine.

20. The method of claim 1 in which epichlorohydrin is polymerized in the presence of a catalyst formed by (a) triisobutylaluminum and (b) tris(4-methoxyphenyl) phosphine.

21. The method of claim 1 in which epichlorohydrin is polymerized in the presence of a catalyst formed by (a) triisobutylaluminum and (b) tri-n-butylphosphine.

22. The method of claim 1 in which epichlorohydrin and propylene oxide are polymerized in the presence of a catalyst formed by (a) triisobutylaluminum and (b) triphenylphosphine.

23. The method of claim 1 in which epichlorohydrin and allyl glycidyl ether are polymerized in the presence of a catalyst formed by (a) triisobutylaluminum and (b) triphenylphosphine.

24. The method of claim 1 in which epichlorohydrin and methyl methacrylate are polymerized in the presence of a catalyst formed by (a) triisobutylaluminum and (b) triphenylphosphine.

References Cited

UNITED STATES PATENTS

| | | | |
|---|---|---|---|
| 3,094,513 | 6/1963 | Kropa | 260—89.5 |
| 3,110,695 | 11/1963 | Ceresa | 260—45.5 |
| 3,285,870 | 11/1966 | Vandenberg | 260—24 |
| 3,259,590 | 7/1966 | Weissermel | 260—2 |

WILLIAM H. SHORT, Primary Examiner

E. A. NIELSEN, Assistant Examiner

U.S. Cl. X.R.

252—431; 260—2, 47, 63, 89.3 89.5 91.1, 615

UNITED STATES PATENT OFFICE

CERTIFICATE OF CORRECTION

Patent No. 3,553,182        Francis X. Mueller, Jr.        Dated:    January 5,

It is certified that error appears in the above-identified patent and the Letters Patent are hereby corrected as shown below:

Column 9, end of line 12, "tri-" should be --- triiso- --- .

Signed and sealed this 28th day of September 1971.

(SEAL)
Attest:

EDWARD M. FLETCHER, JR.                ROBERT GOTTSCHALK
Attesting Officer                      Acting Commissioner of Patents